United States Patent
Kang et al.

(10) Patent No.: US 10,209,828 B2
(45) Date of Patent: Feb. 19, 2019

(54) SYSTEMS AND METHODS FOR WATER DETECTION BY TOUCHSCREEN PANELS

(71) Applicant: STMicroelectronics Asia Pacific Pte Ltd, Singapore (SG)

(72) Inventors: Tae-gil Kang, Icheon-Si (KP); Jerry Kim, Kyounggi-Do (KP); Kai Lim, Incheon (KP)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 316 days.

(21) Appl. No.: 15/201,714

(22) Filed: Jul. 5, 2016

(65) Prior Publication Data

US 2018/0011595 A1    Jan. 11, 2018

(51) Int. Cl.
    *G06F 3/041*       (2006.01)
    *G06F 3/044*       (2006.01)

(52) U.S. Cl.
    CPC ............ *G06F 3/0418* (2013.01); *G06F 3/044* (2013.01); *G06F 2203/04104* (2013.01)

(58) Field of Classification Search
CPC . G06F 3/041; G06F 3/045; G06F 3/02; G01R 27/26; G09G 5/00
See application file for complete search history.

(56) References Cited

U.S. PATENT DOCUMENTS

| | | | |
|---|---|---|---|
| 2016/0070388 A1* | 3/2016 | Yoshikawa | G06F 3/0418 345/174 |
| 2016/0274727 A1* | 9/2016 | Nakamura | G06F 3/044 |
| 2016/0291796 A1* | 10/2016 | Ho | G06F 3/044 |
| 2017/0017336 A1* | 1/2017 | Mayumi | G06F 3/041 |

* cited by examiner

*Primary Examiner* — Pegeman Karimi
(74) *Attorney, Agent, or Firm* — Crowe & Dunlevy

(57) ABSTRACT

A system and method for multi-touch integrity sensing for a multi-touch capacitive touch screen determines a distinction between wanted touches, such as via a finger or stylus, and unwanted touches such as via foreign matter, errors, and the like. Mutual capacitance and self-capacitance sensing data is collected and processed to identify reference strengths and detection thresholds. If differences between mutual/self-capacitance strength and the corresponding reference strengths exceed the corresponding detection thresholds, then the touch is classified as an unwanted (for example, water) touch.

25 Claims, 8 Drawing Sheets

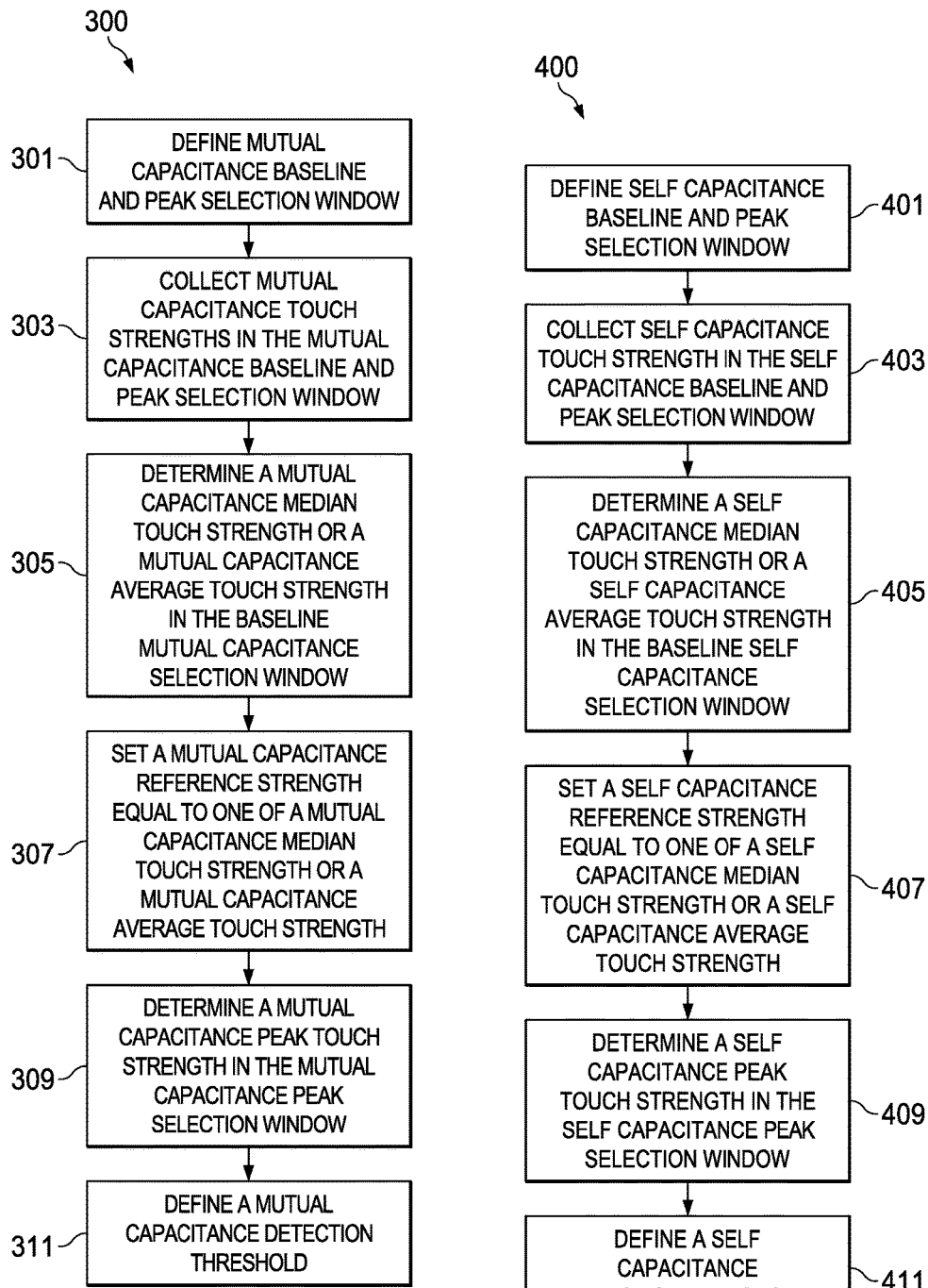

| | RX0 | RX1 | RX2 | RX3 | RX4 | RX5 | RX6 | RX7 | RX8 | RX9 | RX10 | RX11 | RX12 | RX13 | RX14 | RX15 |
|---|---|---|---|---|---|---|---|---|---|---|---|---|---|---|---|---|
| TX1 | 5008 | 5006 | 4956 | 4970 | 4972 | 4967 | 5102 | 5103 | 5040 | 5055 | 5073 | 5076 | 5004 | 5044 | 5036 | 5018 |
| TX3 | 4940 | 4933 | 5066 | 5081 | 5090 | 5072 | 5007 | 5015 | 4952 | 4962 | 4973 | 4978 | 5073 | 4943 | 4940 | 5080 |
| TX4 | 5080 | 4922 | 5053 | 5073 | 5078 | 5059 | 4999 | 4999 | 4938 | 4947 | 4960 | 4956 | 5052 | 5088 | 5074 | 5053 |
| TX5 | 4992 | 5085 | 5020 | 5041 | 5038 | 5017 | 4961 | 4960 | 5055 | 5062 | 4913 | 4915 | 5011 | 5042 | 5039 | 5028 |
| TX6 | 5041 | 5087 | 5023 | 5030 | 5026 | 5009 | 4942 | 5102 | 5037 | 5048 | 5066 | 5058 | 5014 | 4917 | 4931 | 5101 |
| TX7 | 4948 | 5068 | 5077 | 5024 | 5014 | 5000 | 4928 | 5092 | 5022 | 5028 | 5046 | 5037 | 4996 | 5479 | 5229 | 5202 |
| TX8 | 5061 | 5030 | 5075 | 4996 | 4994 | 4993 | 5059 | 5061 | 4993 | 5003 | 5021 | 5009 | 4741 | 5685 | 5748 | 4966 |
| TX9 | 5030 | 5025 | 5080 | 4994 | 4993 | 5103 | 5064 | 5057 | 4997 | 5005 | 5031 | 5023 | 5056 | 5148 | 5263 | 5258 |
| TX10 | 4985 | 4987 | 5070 | 4954 | 4948 | 5017 | 5030 | 5029 | 4966 | 4970 | 4992 | 4986 | 4938 | 5030 | 4904 | 5061 |
| TX11 | 4986 | 4994 | 4922 | 4950 | 4959 | 5061 | 5041 | 5084 | 5054 | 4925 | 4945 | 4940 | 5019 | 5047 | 5036 | 5032 |
| TX12 | 5004 | 5048 | 4968 | 4973 | 4965 | 4969 | 5086 | 5023 | 5046 | 5062 | 4921 | 5101 | 4928 | 4935 | 5053 | 4954 |
| TX14 | 4963 | 5009 | 4984 | 5018 | 5068 | 4982 | 4947 | 5080 | 4985 | 4986 | 5030 | 5085 | 4999 | 5072 | 4991 | 5004 |

FIG. 7

| TX0 | 9511 |
| TX1 | 9545 |
| TX2 | 9519 |
| TX3 | 9512 |
| TX4 | 9542 |
| TX5 | 9568 |
| TX6 | 9563 |
| TX7 | 9548 |
| TX8 | 9556 |
| TX9 | 9544 |
| TX10 | 9512 |
| TX11 | 9531 |
| TX12 | 9542 |
| TX13 | 9528 |
| TX14 | 9547 |
| TX15 | 9536 |

FIG. 8

|     | RX0  | RX1  | RX2  | RX3  | RX4  | RX5  | RX6  | RX7  | RX8  | RX9  | RX10 | RX11 | RX12 | RX13 | RX14 | RX15 |
|-----|------|------|------|------|------|------|------|------|------|------|------|------|------|------|------|------|
| TX1 | 5008 | 5006 | 4956 | 4970 | 4972 | 4967 | 5102 | 5103 | 5040 | 5055 | 5073 | 5076 | 5004 | 5044 | 5036 | 5018 |
| TX2 | 5038 | 5069 | 4949 | 4925 | 4927 | 5109 | 5050 | 5052 | 4992 | 5001 | 5027 | 5023 | 4946 | 4988 | 4978 | 4951 |
| TX3 | 4940 | 4933 | 5066 | 5081 | 5090 | 5072 | 5007 | 5015 | 4952 | 4962 | 4973 | 4978 | 5073 | 4943 | 4940 | 5080 |
| TX4 | 5080 | 4922 | 5053 | 5073 | 5078 | 5059 | 4999 | 4999 | 4938 | 4947 | 4960 | 4956 | 5052 | 5088 | 5074 | 5053 |
| TX5 | 4992 | 5085 | 5020 | 5041 | 5038 | 5017 | 4961 | 4960 | 5055 | 5062 | 4913 | 4915 | 5011 | 5042 | 5039 | 5028 |
| TX6 | 5041 | 5087 | 5023 | 5030 | 5026 | 5009 | 4942 | 5102 | 5037 | 5048 | 5066 | 5058 | 5014 | 4917 | 4931 | 5101 |
| TX7 | 4948 | 5068 | 5077 | 5024 | 5014 | 5000 | 4928 | 5092 | 5022 | 5028 | 5046 | 5037 | 4996 | 5479 | 5229 | 5202 |
| TX8 | 5061 | 5030 | 5075 | 4996 | 4994 | 4993 | 5059 | 5061 | 4993 | 5003 | 5021 | 5009 | 4741 | 5685 | 5748 | 4966 |
| TX9 | 5030 | 5025 | 5080 | 4994 | 4993 | 5103 | 5064 | 5057 | 4997 | 5005 | 5031 | 5023 | 5056 | 5148 | 5263 | 5258 |
| TX10| 4985 | 4987 | 5070 | 4954 | 4948 | 5017 | 5030 | 5029 | 4966 | 4970 | 4992 | 4986 | 4938 | 5030 | 4904 | 5061 |
| TX11| 4986 | 4994 | 4922 | 4950 | 4959 | 5061 | 5041 | 5084 | 5054 | 4925 | 4945 | 4940 | 5019 | 5047 | 5036 | 5032 |
| TX12| 5004 | 5048 | 4968 | 4973 | 4965 | 4969 | 5086 | 5023 | 5046 | 5062 | 5021 | 5101 | 4928 | 4935 | 5053 | 4954 |
| TX13| 5077 | 5026 | 4971 | 5856 | 5915 | 4966 | 5884 | 5994 | 4955 | 4950 | 5939 | 5999 | 4965 | 5922 | 4982 | 5955 |
| TX14| 4963 | 5009 | 4984 | 5018 | 5038 | 4982 | 4947 | 5080 | 4985 | 4986 | 5030 | 5085 | 4999 | 5072 | 4991 | 5004 |

FIG. 9

SYSTEMS AND METHODS FOR WATER DETECTION BY TOUCHSCREEN PANELS

FIELD OF THE INVENTION

The present disclosure generally relates to capacitive touchscreen panels and, more particularly, to a system and method for water detection for use in a capacitive touchscreen panel.

BACKGROUND

Touchscreen panels are typically incorporated in various electronic devices to detect a user input (i.e., user touch or hover) and to display content. The touchscreen panels include an active portion capable of detecting the user input and displaying content. This active portion is typically formed from a display panel on top of which a capacitive sensing panel is provided which includes multiple layers of capacitive sensing circuitry arranged in a pattern.

A capacitive sensing panel may be provided in a touchscreen panel for an electronic device such as a smart phone, GPS device, tablet computer, mobile media player, remote control device, or any other device capable of using a touchscreen panel. The sensing panel includes a patterned array of conductive features arranged in an overlapping configuration. For instance, the patterned array of conductive features may include sets of overlapping lines, conductive pads, interleaved structures, diamond structures, lattice structures, and the like. The overlapping conductive features may form mutual capacitive nodes at various points of overlap and/or the conductive features may form self-capacitive nodes between each of the features and a circuit ground. The capacitive sensing panel may evaluate changes in capacitance at each capacitive node to detect a user touch or hover, such as by a finger or other body part as well as by a tool such as a stylus.

SUMMARY

A method of touch status determination is provided. The method includes receiving six input values. The values include (i) a mutual capacitance detection threshold, (ii) a mutual capacitance peak strength, (iii) a mutual capacitance reference strength including one of an average touch strength or a median touch strength of a first randomized selection of nodes of a multi-touch capacitive touch screen, (iv) a self-capacitance detection threshold, (v) a self-capacitance peak strength, and (vi) a self-capacitance reference strength including one of an average touch strength or a median touch strength of a second randomized selection of nodes of the multi-touch capacitive touch screen. The method includes, in response to the six input values, outputting a touch status selected from a touch status truth table representative of whether at least one of water or a wanted touch is present on the multi-touch capacitive touch screen.

A further method is disclosed. The method includes performing a first touch detection. The first touch detection includes defining a peak node selection window having a fixed window and defining a reference node selection window having a randomized reference selection window including a random number of nodes arranged in a random pattern across a multi-touch capacitive touch screen. The method includes determining a capacitance detection threshold in response to a comparison of a touch strength associated with one or more node of the peak node selection window and the touch strength associated with one or more node of the reference node selection window.

A method of water detection is contemplated. The method includes performing a mutual capacitance touch detection, performing a self-capacitance touch detection, and performing a touch status determination method in response to the mutual capacitance touch detection and the self-capacitance touch detection.

BRIEF DESCRIPTION OF DRAWINGS

The foregoing and other features and advantages of the present disclosure will become further apparent from the following detailed description of the embodiments, read in conjunction with the accompanying drawings. The detailed description and drawings are merely illustrative of the disclosure, rather than limiting the scope of the invention as defined by the appended claims and equivalents thereof.

Embodiments are illustrated by way of example in the accompanying figures not necessarily drawn to scale, in which like numbers indicate similar parts, and in which:

FIG. 3 illustrates a mutual capacitance touch detection method for the multi-touch capacitive touch screen;

FIG. 4 illustrates a self-capacitance touch detection method for a multi-touch capacitive touch screen;

FIG. 7 illustrates a mutual capacitance touch scenario involving a fixed node reference selection window;

FIG. 8 illustrates a self-capacitance touch scenario involving a fixed node reference selection window;

FIG. 9 illustrates a mutual-capacitance touch scenario involving a randomized node reference selection window.

DETAILED DESCRIPTION OF THE DRAWINGS

Figure 1A:
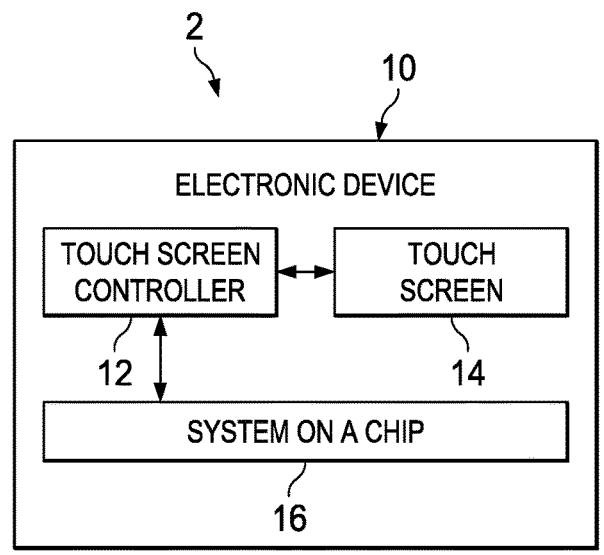
FIG. 1A illustrates an electronic device having a multi-touch capacitive touch screen configured to receive user input.

With reference to FIG. 1A, an electronic device 2 comprises any device configured to receive user input. For example, an electronic device 2 may comprise a smart phone, a GPS device, a tablet computer, a mobile media player, a remote control device, or any other device as desired. The electronic device 2 further comprises a touch sensitive interface system 10. A touch sensitive interface system 10 is configured to accept user input via touching such as from the user's body and/or a tool such as a stylus. The touch sensitive interface system 10 also provides output, such as by a human-readable display.

More specifically, the touch sensitive interface system 10 comprises a multi-touch capacitive touch screen 14, a touch screen controller 12, and a system on a chip 16. The system on a chip 16 may comprise a processor, interface, circuitry, and/or the like configured to direct the flow of input and output data to a multi-touch capacitive touch screen 14 and an associated touch screen controller 12. A touch screen controller 12 is configured to be in logical communication with the system on a chip 16. The touch screen controller 12 comprises a processor and a memory in logical communication with the multi-touch capacitive touch screen 14. The touch screen controller 12 may perform various methods with respect to the multi-touch capacitive touch screen 14 as discussed further herein.

Figure 1B:
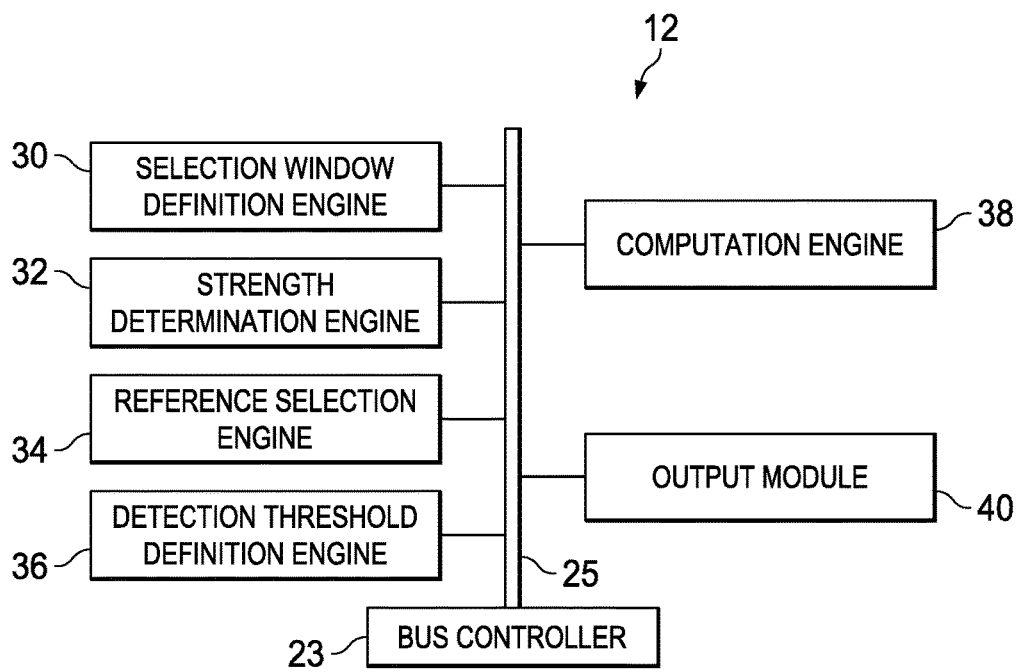
FIG. 1B illustrates a logical structure of a touch screen controller.
Figure 2:
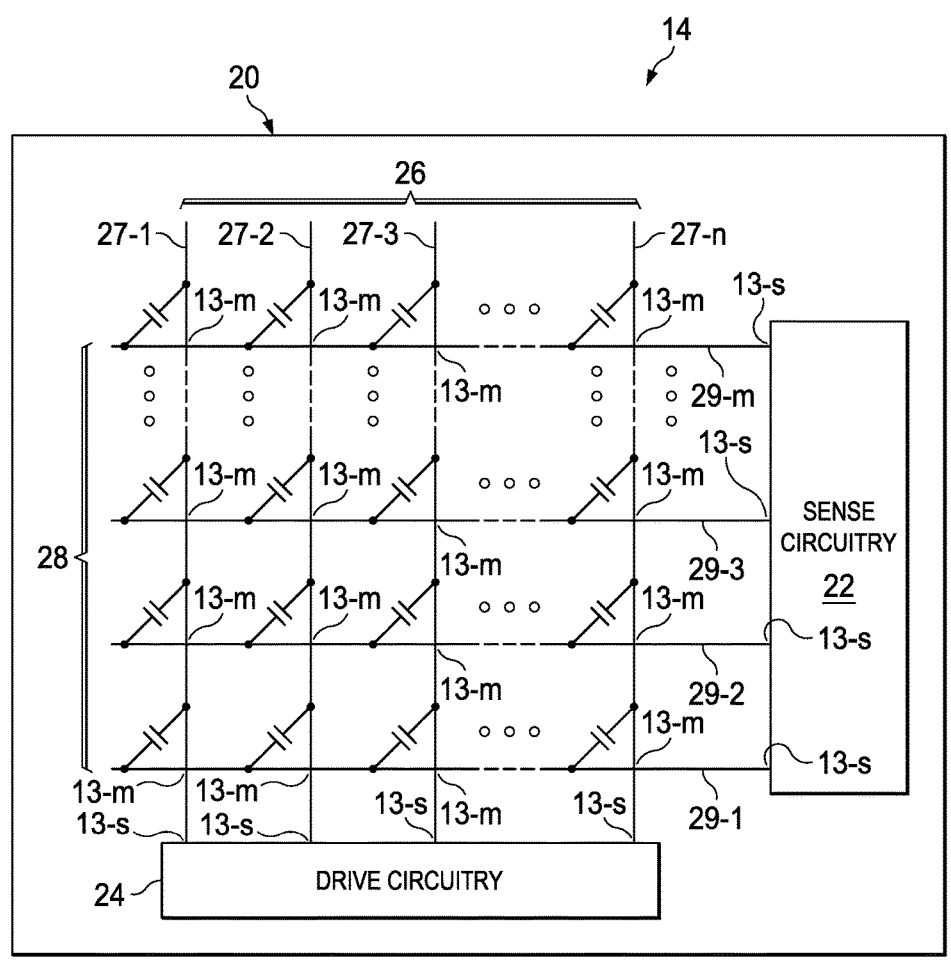
FIG. 2 illustrates a capacitive sensing panel of the multi-touch capacitive touch screen.

With reference to FIGS. 1 and 2, a multi-touch capacitive touch screen 14 includes a capacitive sensing panel 20. The capacitive sensing panel 20 includes a drive array 26 and a sense array 28 operable by a touch screen controller 12 in a mutual capacitance mode and a self-capacitance mode. A drive array 26 comprises an array of conductive features arranged in a matrix with respect to the sense array 28. Similarly, the sense array 28 comprises an array of conductive features arranged in a matrix with respect to the drive array 26. For example, the drive array 26 comprises a first drive line 27-1, a second drive line 27-2, a third drive line 27-3, and any number n of drive lines, such as including an $n^{th}$ drive line 27-n. In like manner, the sense array 28 comprises a first sense line 29-1, a second sense line 29-2, a third sense line 29-3, and any number m of sense lines, such as including an $m^{th}$ sense line 29-m. In various embodiments, an equal number of sense lines 29 and drive lines 27 exist, whereas in further embodiments, the number of sense lines 29 and drive lines 27 differ. Moreover, the touch screen controller 12 may repurpose various sense lines 29 to function as drive lines 27, and various drive lines 27 to function as sense lines 29, from time to time. For example, during a self-capacitance mode discussed below, one or more drive lines 27 or sense lines 29 may perform both drive and sense functions, for instance, a drive line 27 may also serve as a sense line 29 so that self-capacitance (rather than mutual capacitance) is monitored.

The drive array 26 and the sense array 28 may overlap. While FIG. 2 depicts the drive lines 27 of the drive array 26 overlapping the sense lines 29 of the sense array 28 orthogonally, one may appreciate that other shapes than lines may be implemented, and the shapes may overlap other than orthogonally, for instance, such as being interleaved, or at various angles, or otherwise, as desired.

The drive array 26 is connected to drive circuitry 24. The drive circuitry 24 excites one or more drive lines of the drive array 26 such as with an electrical waveform. The sense array 28 is connected to sense circuitry 22. The sense circuitry 22 detects voltage and/or current perturbations on one or more sense lines of the sense array 28 that may be induced in response to the electrical waveform on the drive array 26 and/or further in response to external influences such as the presence of a finger, stylus, or unwanted material such as water. In various embodiments, these perturbations arise from capacitive interaction between the drive array 26, the sense array 28, and/or proximate objects such as a finger or stylus that is interacting with the multi-touch capacitive touch screen 14. As such, one may say that the drive array 26 and sense array 28 share "nodes," wherein a node 13-m arises at each intersection of a sense line 29 or drive line 27 with a drive line 27 or sense line 29, respectively. In various embodiments, such an arrangement facilitates operation in a mutual capacitance mode discussed below.

Furthermore, the drive array 26 and sense array 28 may operate independently so that a single node 13-s arises between a drive line 27 and/or sense line 29 and a circuit ground, rather than nodes 13-m corresponding to intersections of drive lines 27 of the drive array 26 and sense lines 29 of the sense array 28. For instance, the drive array 26 is connected to drive circuitry 24 and has one or more drive lines 27 excited by the drive circuitry 24 with an electrical waveform. The drive array 26 may also serve as a sense array 28, thus having a dual purpose. Induced voltage and/or current perturbations may arise on a drive line 27 as a result of the presence of a finger, stylus, or unwanted material such as water, parasitically sinking current from the drive line 27 to a ground. Thus, each drive line 27 of the drive array 26 may be considered to be a single node 13-s, as may each sense line 29 of the sense array 28. Stated another way, each line may be conceptualized as having multiple nodes, as is the case when the mutual capacitance mode is implemented, but every node of the line may be considered equipotential with every other node of the line, so that the line is effectively a single node. While the drive array 26 and sense array 28 are depicted as separate arrays of orthogonal lines in FIG. 2, one may appreciate that the drive array 26 may be its own sense array 28, and vice-versa. In various embodiments, such an arrangement facilitates operation in a self-capacitance mode. Thus, nodes 13-m are mutual capacitance nodes and nodes 13-s are self-capacitance nodes.

As briefly mentioned, a capacitive sensing panel 20 operates in at least two distinct modes, a mutual capacitance mode and a self-capacitance mode.

In a self-capacitance mode, the touch screen controller 12 configures the sense circuitry 22 to sense the capacitance between any given column or row (e.g., a sense line 29 forming a self-capacitance node 13-s and a surrounding panel reference (for example, ground). By sensing a change in self-capacitance for the given column or row, the sense circuitry 22 detects a user touch or hover at or near that given column or row. Advantageously, self-capacitance mode sensing provides better rejection of unwanted foreign matter, such as water, in contact with the multi-touch capacitive touch screen 14. Unfortunately, self-capacitance mode sensing is prone to a ghosting problem associated with a multi-touch situation because the entire length of the given column or row of the sense line 29 is used to sense (e.g., the entire sense line 29 forms a single node 13-s) and thus the sense circuitry 22 is not able to unambiguously distinguish between different touch/hover instances falling along a same row or column.

In a self-capacitance mode, the touch screen controller 12 directs the drive circuitry 24 to excite the drive array 26 with a waveform and repurpose the drive array 26 to serve a dual role also as a sense array 28, and/or may repurpose the sense circuitry 22 to further function as a drive circuitry 24, driving the sense array 28 with a waveform. The touch screen controller 12 monitors the amount of charge (or current) needed to substantially fully charge a capacitance disposed between one or more associated self-capacitance nodes 13-s of the array and a circuit ground. The stored charge may discharge via a current directly coupled from the self-capacitance node 13-s to a finger, stylus or other touch (and to a lesser degree, via fringe field coupling to adjacent self-capacitance nodes 13-s). A water droplet increases the fringe field strength, enhancing the capacitive coupling between the node 13-s and adjacent nodes 13-s of adjacent lines. However, because the adjacent nodes 13-s of adjacent lines are much smaller current sinks than a finger, stylus or other touch, the effect of a water droplet is substantially less than that of a desired touch and may be filtered out as an error. Moreover, the effects of a water droplet may be even further diminished by driving the adjacent lines with a waveform similar or identical to that exciting the drive array 26, in this manner, substantially zeroing any potential difference between the node 13-s and adjacent nodes 13-s of the adjacent lines, and thus substantially zeroing any potential current flow via a fringe field between nodes 13-s.

In a mutual-capacitance mode, the touch screen controller 12 configures the sense circuitry 22 to sense the capacitance at an intersection point (node 13-m) between one column/row of a sense line 29 and one row/column of a drive line 27. Thus, each row or column is associated with multiple nodes 13-m in a mutual-capacitance mode, whereas each is associated with only a single node 13-s in a self-capacitance mode. By sensing a change in mutual-capacitance at a given node 13-m between a sense line 29 and a drive line 27, the sense circuitry 22 detects a user touch or hover at or near that given intersection point. Advantageously, mutual-capacitance mode sensing provides higher resolution for detecting the particular location of a user touch or hover, and enables the sense circuitry 22 to distinguish between and identify the locations of multi-touch/hover situations, including along the same row or column. Unfortunately, a mutual-capacitance mode is prone to falsely detecting unwanted foreign matter, such as water in contact with the multi-touch capacitive touch screen 14 as a touch, because the water also changes the mutual-capacitance at an affected node 13-m.

During a mutual capacitance mode, the touch screen controller 12 evaluates the capacitance existing between the drive array 26 and sense array 28 at each node 13-m while directing the drive circuitry 24 to excite the drive array 26 with a waveform. The touch screen controller 12 directs the sense circuitry 22 to monitor the sense array 28 to quantify a potentially coupled signal coupled to the sense array 28 from the drive array 26. For instance, a fringe field may couple the sense array 28 to the drive array 26 at the location of each node 13-m. A finger, stylus, or other touch desired to be detected effectively steals charge from the node 13-m by diverting current that would otherwise pass through the fringe field between the sense array 28 and drive array 26 to a current sink, such as ground. As such, a net reduction in mutual capacitance at the node 13-m occurs. Furthermore, a water droplet increases the fringe field strength, enhancing the capacitive coupling between the sense array 28 and drive array 26 at the node 13-m and increasing the flow of current through the fringe field between the sense array 28 and the drive array 26, introducing anomalies to the sensed waveform detected by the sense circuitry 22. One may appreciate that a water droplet increases coupling (and current transfer) and increases capacitance between the sense array 28 and drive array 26 at the node 13-m, while a touch steals charge from the node 13-m and decreases the capacitance. As such, a touch and a water droplet are in some instances identifiable by their opposite effect on capacitance at each node 13-m. The effect of water may balance, or overpower the effect of a touch, causing detection errors.

While the mutual capacitance mode enables detection of multiple simultaneous touches along a same row or a same column, the self-capacitance mode enables the differentiation of finger or stylus touches from water droplets at the cost of being less able to resolve multiple simultaneous touches along a same row or a same column. The opposite advantages and disadvantages of self-capacitance mode and mutual-capacitance mode often lead the system designer to choose operation of the panel in one or the other mode based on whether the panel is being provided in an environment where water rejection is preferred or an environment where multi-touch detection (with accurate location resolution) is preferred. Furthermore, the system may be chosen to change from one mode to another, or to operate in both modes. The data generated by each mode may be combined to resolve touches. However, because the two modes are relatively independent, there is a need in the art for solutions which would enable a panel to enjoy the benefits of both self-capacitance mode and mutual-capacitance mode while also identifying when the two modes diverge so that the integrity of the data produced may be determined to be more or less reliable.

With reference to FIG. 1B and FIGS. 3-5, a touch screen controller 12 may comprise various logical modules, which, in connection with the electronic device 2 of FIG. 1A, and the multi-touch capacitive touch screen 14 of FIGS. 1A and 2, may interoperate to execute various computer implemented methods in order to detect wanted touches and to classify touches as being a wanted touch, or as being an unwanted touch, such as the presence of water.

A touch screen controller 12 may comprise a bus 25 and a bus controller 23. The bus 25 may comprise a physical bus, or may comprise a logical bus resident in the touch screen controller 12. Moreover, the bus controller 23 may comprise a logical unit of the touch screen controller 12 configured to direct communication between and among the different engines and modules connected to the bus 25.

The touch screen controller 12 may comprise a selection window definition engine 30. A selection window definition engine 30 may comprise an aspect of a processor and/or electronic storage memory configured to choose which nodes 13-m, 13-s of the multi-touch capacitive touch screen 14 to evaluate for potential touches. A selection window definition engine 30 may define a variety of different nodes 13-m, 13-s arranged in a variety of different patterns. For instance, with additional reference to FIGS. 7-10, the selection window definition engine 30 may define one or more mutual capacitance fixed peak node selection windows 46, mutual capacitance fixed reference node selection windows 48, self-capacitance fixed peak node selection windows 50, self-capacitance fixed reference node selection windows 52, mutual capacitance randomized reference node selection windows 49, and self-capacitance randomized reference node selection windows 53.

Thus, one may appreciate that two general modes of operation of the selection window definition engine 30 are contemplated. For instance, with reference to FIGS. 7 and 8, a window with a fixed area may be chosen for both the selection and reference windows in mutual capacitance mode, and in self-capacitance mode. Correspondingly, with reference to FIGS. 9-10, a window with a randomized area may be chosen for the reference windows in mutual capacitance mode and in self-capacitance mode. Fixed area windows are again implemented for the selection windows. In this manner, touches may be detected within a selection window based on reference strengths indicative of nodes that are not being touched. These reference strengths may be sourced from fixed area windows, or may be sourced from randomized windows. Various benefits attributable to fixed area windows and randomized windows may be enjoyed depending on the configuration of the selection window definition engine 30.

The touch screen controller 12 may comprise a strength determination engine 32. The strength determination engine 32 may comprise an aspect of a processor and/or electronic storage memory configured to characterize a touch strength associated with each node 13-m, 13-s of the multi-touch capacitive touch screen 14. For instance, each node 13-m, 13-s may be associated with a capacitance. This capacitance may be altered by the presence of a wanted touch or an unwanted touch, such as by a finger or stylus, or by a foreign material such as a water droplet. This capacitance may be measured to determine a "touch strength." In various embodiments, the touch strength comprises a signed integer, such as a raw capacitance strength value or a signed integer computed by a comparison to a stored reference strength. By comparing a touch strength associated with one or more node 13-m, 13-s at rest ("baseline node(s) strength") with a touch strength associated with one or more node 13-m, 13-s believed to be under the influence of a touch or an unwanted touch, the presence of wanted and unwanted touches may be ascertained. The strength determination engine 32 scans the nodes 13-m, 13-s and captures the touch strength associated with each into a computer memory.

The touch screen controller 12 may comprise a reference selection engine 34. The reference selection engine 34 may select which nodes 13-m, 13-s of the multi-touch capacitive touch screen 14 to consider when determining the baseline node strength. For instance, in various embodiments, the reference selection engine 34 works with the selection window definition engine 30 to elect the use of fixed windows. A fixed window comprises a predetermined fixed set of nodes 13-m, 13-s. In further embodiments, the reference selection engine 34 works with the selection window definition engine 30 to elect the use of randomized windows. A randomized window comprises a randomly selected, dynamic set of nodes 13-m, 13-s. The nodes 13-m, 13-s may be adjacent, or may be non-adjacent and may be distributed randomly or pseudo-randomly across all or part of the multi-touch capacitive touch screen 14.

Following the selection of the windows, the reference selection engine 34 may then work with the strength determination engine 32 to receive the touch strengths of the nodes 13-m, 13-s within the reference window and the process these touch strengths to ascertain an appropriate baseline value of touch strength, called the baseline node strength. This baseline value will be used in comparison operations by the detection threshold definition engine 36 to compare the touch strength associated with one or more node 13-m, 13-s against the baseline value to indicate whether the node 13-m, 13-s is under the influence of a wanted touch or an unwanted touch, or no touch at all ("touch status").

The touch screen controller 12 may comprise a detection threshold definition engine 36. The detection threshold definition engine 36 may receive the baseline value from the reference selection engine 34 and may make the mentioned comparison, whereby the touch status is established. This process may involve various calculations such as those associated with FIG. 5, which may be performed by the computation engine 38 at the direction of the detection threshold definition engine 36. The results may be propagated to other systems and methods, such as input/output devices operating in response to the touches. This propagation is effectuated by the output module 40.

Figures 5, 6:
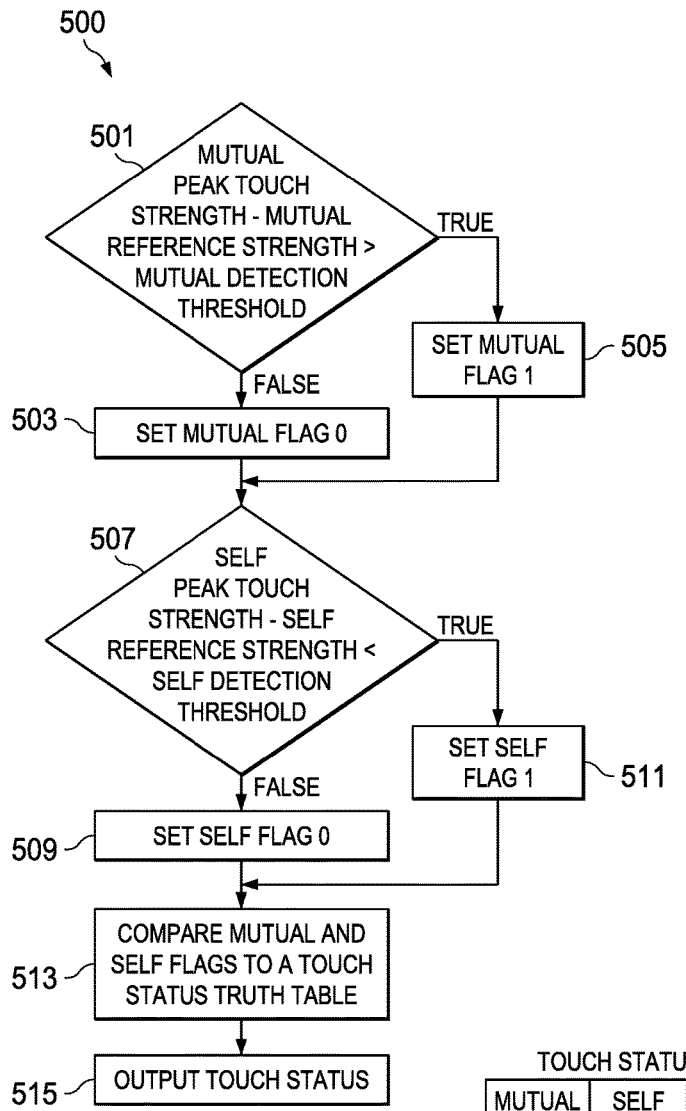
FIG. 5 illustrates a touch status determination method for a multi-touch capacitive touch screen.
FIG. 6 illustrates a touch status truth table associated with the method of FIG. 5.

Having discussed broadly various aspects of the touch screen controller 12, attention is now directed to FIGS. 1A-5. FIG. 3 illustrates a mutual capacitance touch detection method 300, FIG. 4 illustrates a self-capacitance touch detection method 400, and FIG. 5 illustrates a touch status determination method 500. These three methods, when implemented together form a method of water detection. In various embodiments, methods 300 and 400 may be implemented in any order, or in simultaneity, followed by method 500.

In various embodiments, the selection window definition engine 30 of a touch screen controller 12 may define both a mutual capacitance peak node selection window and a mutual capacitance reference node selection window (Step 301). A mutual capacitance reference node selection window comprises a set of mutual capacitance nodes 13-m of a multi-touch capacitive touch screen 14 of which each node's touch strength is measured in order to calculate a baseline node strength. A mutual capacitance peak node selection window comprises a set of mutual capacitance nodes 13-m of a multi-touch capacitive touch screen 14 of which each node's touch strength is measured in order to determine a peak touch strength. A peak touch strength is a highest magnitude of touch strength detected (associated with a mutual capacitance node 13-m) within the mutual capacitance peak selection window. The touch screen controller 12 defines which nodes 13-m will be a part of the set associated with the mutual capacitance reference node selection window, and which nodes 13-m will be a part of the set associated with the mutual capacitance peak node selection window.

For instance, with additional reference to FIG. 7, a mutual capacitance fixed peak node selection window 46 and a mutual capacitance fixed reference node selection window 48 may be defined. Thus, one may appreciate that the reference node selection window may be fixed. For instance, a fixed window may comprise bands one node in width, and having a length extending from one end to the other end of the multi-touch capacitive touch screen 14. A fixed window may comprise two such bands, each at opposite sides of the multi-touch capacitive touch screen 14. For instance, each band may be at laterally distal ends of the multi-touch capacitive touch screen 14 and extend between longitudinally distal sides of the multi-touch capacitive touch screen 14.

A mutual capacitance peak node selection window 46 may be a continuous region of the multi-touch capacitive touch screen 14 within which a touch may potentially be detected. For instance, in various embodiments, the mutual capacitance peak node selection window comprises the entire area of the multi-touch capacitive touch screen 14, while in further embodiments, it may exclude nodes 13-m forming the outward perimeter of the multi-touch capacitive touch screen 14, for instance, to exclude potentially erroneous touches caused by structural anomalies at the edge of the multi-touch capacitive touch screen 14 that may be caused by an enclosure of the screen or other mechanisms.

The mutual capacitance touch strengths of each node 13-m in the mutual capacitance reference node selection window, and the mutual capacitance touch strengths of each node 13-m in the mutual capacitance peak selection window may be collected by the strength determination engine 32 (step 303). In various embodiments, the mutual capacitance reference node selection window comprises a mutual capacitance fixed reference node selection window 48 (FIG. 7) as chosen by the reference selection engine 34.

With additional reference to FIG. 9, a mutual capacitance randomized reference node selection window 49 is defined. Thus, one may appreciate that the reference node selection window may be randomized. A randomized window may comprise any number of nodes 13-m arranged in any manner across the multi-touch capacitive touch screen 14.

Again, a mutual capacitance peak node selection window 46 may be a continuous region of the multi-touch capacitive touch screen 14 within which a touch may potentially be detected. For instance, in various embodiments, the mutual capacitance peak node selection window comprises the entire area of the multi-touch capacitive touch screen 14, while in further embodiments, it may exclude nodes 13-m forming the outward perimeter of the multi-touch capacitive touch screen 14, for instance, to exclude potentially erroneous touches caused by structural anomalies at the edge of the multi-touch capacitive touch screen 14 that may be caused by an enclosure of the screen or other mechanisms.

The mutual capacitance touch strengths of each node 13-m in the mutual capacitance reference node selection window, and the mutual capacitance touch strengths of each node 13-m in the mutual capacitance peak selection window may be collected by the strength determination engine 32 (step 303). In various embodiments, the mutual capacitance reference node selection window comprises a mutual capacitance randomized reference node selection window 49 (FIG. 9), as chosen by the reference selection engine 34.

In both embodiments, whether implementing a fixed or randomized mutual capacitance reference node selection window, touch strengths are used to determine a mutual capacitance median touch strength comprising the median touch strength collected in the mutual capacitance reference node selection window, or in further embodiments, to determine a mutual capacitance average touch strength comprising the average touch strength collected in the mutual capacitance reference node selection window (Step 305). This median or average value is important to setting the reference strength against which touch strengths are compared to determine touch status. The computation engine 38 may calculate this median or average value in response to the strength determination engine 32 collecting touch strengths in the area set by the reference selection engine 34.

The detection threshold definition engine 36 may interoperate with the computation engine 38 to receive the calculated median or average value and to set a mutual capacitance reference strength equal to one of the mutual capacitance median touch strength or a mutual capacitance average touch strength (step 307).

The mutual capacitance touch strengths of each node 13-m in the mutual capacitance peak selection window which were previously collected by the strength determination engine 32 may be processed by the computation engine 38 to determine a mutual capacitance peak touch strength (Step 309). A mutual capacitance peak touch strength comprises the highest magnitude of touch strength detected (associated with a node 13-m) within the mutual capacitance peak selection window. Finally, the mutual capacitance peak touch strength and the mutual capacitance median/average touch strength are processed by the computation engine 38 to define a mutual capacitance detection threshold (step 311). The mutual capacitance detection threshold comprises a touch strength magnitude above which a wanted touch is indicated. Thus, at this point, there are three values stored in computer memory, a mutual capacitance peak touch strength of each mutual capacitance node 13-m of the mutual capacitance peak selection window, a mutual capacitance reference strength, and a mutual capacitance detection threshold.

Having described a mutual capacitance touch detection method 300, attention is directed to FIGS. 1A, 1B, 2, 4, and 7-10, and away from FIG. 3, for a discussion of a self-capacitance touch detection method 400. In various embodiments, a selection window definition engine 30 of a touch screen controller 12 may define both baseline self-capacitance selection windows and peak self-capacitance selection windows (Step 401). A baseline self-capacitance selection window comprises a set of self-capacitance nodes 13-s of a multi-touch capacitive touch screen 14 of which each node's touch strength is measured in order to calculate a base line value. The touch screen controller 12 defines which self-capacitance nodes 13-s will be a part of the set associated with the baseline self-capacitance selection window, and which self-capacitance nodes 13-s will be a part of the set associated with the peak self-capacitance selection window.

For instance, with additional reference to FIG. 8, a self-capacitance fixed peak node selection window 50 and a self-capacitance fixed reference node selection window 52 may be defined. For instance, a fixed window may comprise all nodes 13-s extending from end to end of the multi-touch capacitive touch screen 14.

Figure 10:
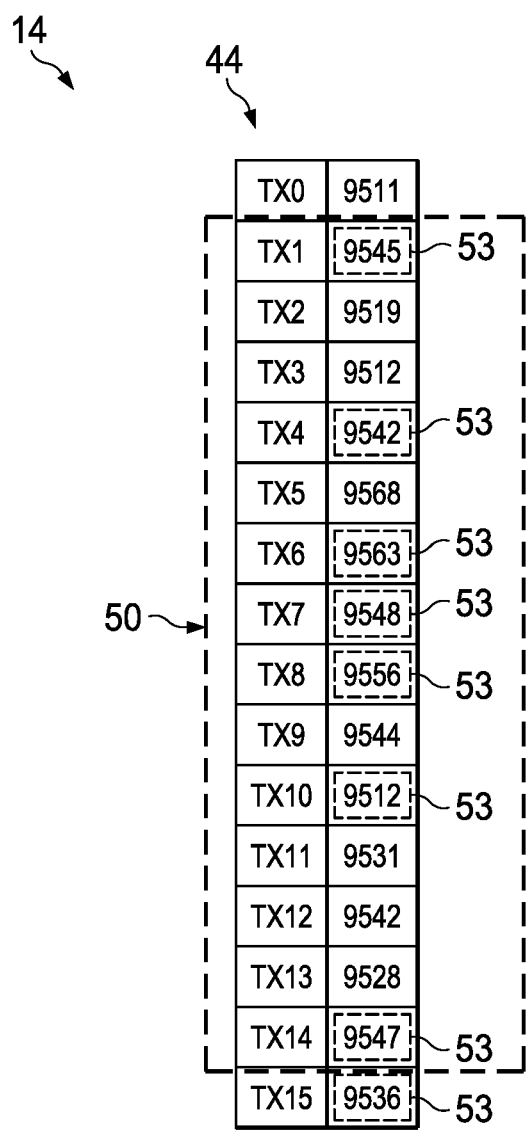
FIG. 10 illustrates a self-capacitance touch scenario involving a randomized node reference selection window.

In further embodiments, such as with additional reference to FIG. 10, a self-capacitance randomized reference node selection window 53 is defined. Thus, one may appreciate that the reference node selection window may be randomized. A randomized window may comprise any number of nodes 13-s arranged in any manner across the multi-touch capacitive touch screen 14.

Renewing focus on FIGS. 1A, 1B, 2, 4, and 7-10, in both embodiments, whether implementing a fixed or randomized self-capacitance reference node selection window, a peak self-capacitance selection window may be a continuous region of the multi-touch capacitive touch screen 14 within which a touch may potentially be detected. For instance, in various embodiments, the peak mutual capacitance selection window comprises the entire area of the multi-touch capacitive touch screen 14, while in further embodiments, it may exclude nodes 13-s located in positions where potentially erroneous touches may be caused by structural anomalies at the edge of the multi-touch capacitive touch screen 14 that may be caused by an enclosure of the screen or other mechanisms.

The self-capacitance touch strengths of each node 13-s in the self-capacitance reference node selection window, and the self-capacitance touch strengths of each node 13-s in the self-capacitance peak node selection window may be collected by the strength determination engine 32 (Step 403). In various embodiments, the self-capacitance reference node selection window comprises a self-capacitance fixed reference node selection window 52 (FIG. 8) or a self-capacitance randomized reference node selection window 53 (FIG. 10), as chosen by the reference selection engine 34.

The self-capacitance touch strengths are used to determine a self-capacitance median touch strength comprising the median touch strength collected in the self-capacitance reference node selection window, or in further embodiments, to determine a self-capacitance average touch strength comprising the average touch strength collected in the self-capacitance reference node selection window. This median or average value is important to setting the reference strength against which touch strengths are compared to determine touch status. The computation engine 38 may calculate this median or average value in response to the strength determination engine 32 collecting touch strengths in area set by the reference selection engine 34.

The detection threshold definition engine 36 may interoperate with the computation engine 38 to receive the calculated median or average value and to set a self-capacitance reference strength equal to one of the self-capacitance median touch strength or a self-capacitance average touch strength (step 407).

The self-capacitance touch strengths of each node 13-s in the self-capacitance peak selection window which were previously collected by the strength determination engine 32 may be processed by the computation engine 38 to determine a self-capacitance peak touch strength (Step 409). A self-capacitance peak touch strength comprises the touch strength comprising a highest magnitude of touch strength associated with a self-capacitance node 13-s within the self-capacitance peak selection window. Finally, the self-capacitance peak touch strength and the self-capacitance median/average touch strength are processed by the computation engine 38 to define a self-capacitance detection threshold (step 411). The self-capacitance detection threshold comprises a touch strength magnitude above which a wanted touch is indicated. Thus, at this point, there are three additional values stored in computer memory a self-capacitance peak touch strength of each node 13-s of the self-capacitance peak selection window, a self-capacitance reference strength, and a self-capacitance detection threshold.

With reference now to FIGS. 1A, 1B, 2, 5, and 6, a touch status determination method 500 is disclosed. Thus far, a mutual capacitance touch detection method 300 assembled three values: a mutual capacitance peak touch strength of each mutual capacitance node 13-m of the mutual capacitance peak selection window, a mutual capacitance reference strength, and a mutual capacitance detection threshold. A self-capacitance touch detection method 400 assembled three additional values: a self-capacitance peak touch strength of each self-capacitance node 13-s of the self-capacitance peak selection window, a self-capacitance reference strength, and a self-capacitance detection threshold. Now, the computation engine 38 will perform a touch status determination method 500 that accepts these values as inputs and provides as an output, a touch status selected from the touch status truth table 600. The method 500 comprises a mutual flag setting step comprising the evaluation of a first truth statement based on the mutual-capacitance detection threshold, the mutual capacitance peak strength, and the mutual capacitance reference strength (step 501): Mutual Peak Touch Strength−Mutual Reference Strength>Mutual Detection Threshold. If the first truth statement returns FALSE, a mutual status flag is set to FALSE (step 503) and if the first truth statement returns TRUE, a mutual status flag is set to TRUE (step 505). A self-flag setting step comprising the evaluation of a second truth statement (step 507) is also performed. The truth statement is: Self-Peak Touch Strength−Self Reference Strength<Self-Detection Threshold. If the second truth statement returns FALSE, a self-status flag is set to FALSE (step 509) and if the second truth statement returns TRUE, a self-status flag is set to TRUE (step 511). Having thus derived both a self-status flag and a mutual status flag, the mutual and self-status flags are compared to the touch status truth table 600 (step 513) and a touch status is output (step 515) by the computation engine 38 in conjunction with the output module 40.

With specific reference to FIG. 6, two touch statuses are possible. For instance, to determine whether water is present on a screen, an indication 601 (MUTUAL FLAG: FALSE, SELF FLAG: FALSE) or an indication 603 (MUTUAL FLAG: FALSE, SELF FLAG: TRUE), or an indication 605 (MUTUAL FLAG: TRUE, SELF FLAG: FALSE) all represent the absence of foreign matter (e.g., water) on the screen. Alternatively, an indication 607 (MUTUAL FLAG: TRUE; SELF FLAG: TRUE) represents an indication that foreign matter (e.g., water) is present on the screen. In various embodiments, further information may be developed. For instance, an indication 601 may represent that no water is present on the touch screen, but a possible error exists and may be provided in response to a mutual flag and self-flag both being set to FALSE. Alternatively, an indication 603 may represent the presence of a wanted touch in response to a mutual flag being set to FALSE and a self-flag being set to TRUE. Moreover, an indication 605 may indicate that neither water nor a touch is present in response to a mutual flag being set to TRUE and a self-flag being set to FALSE. Finally, an indication 607 may convey that water is present and may be indicated in response to a mutual flag and self-flag both being set to TRUE. Various systems and processes may make various decisions in response to the touch status, such as to activate a clickable button, accept user input, reject the corrupting influence of unwanted water, and/or the like.

An advantage of the disclosed implementation is that the design supports multiple finger touch detection (using the mutual capacitance sensing mode) and water droplet rejection (using the self-capacitance sensing mode). Thus, the design enables provision of very fine multi-touch accuracy and linearity owing to the mutual capacitance sensing operation as well as operation in hostile and mobile environments. While sequential operation of mutual capacitance sensing and self-capacitance sensing modes is discussed for brevity, one may appreciate that a plurality of sense arrays and/or drive arrays may be so arranged as to permit simultaneous operation of a touch screen in both modes.

The foregoing description has provided by way of exemplary and non-limiting examples a full and informative description of one or more exemplary embodiments of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the claims.

What is claimed is:

1. A method of touch status determination, comprising:
   receiving six input values comprising:
   (i) a mutual capacitance detection threshold,
   (ii) a mutual capacitance peak strength,
   (iii) a mutual capacitance reference strength comprising one of an average touch strength or a median touch strength of a first selection of nodes of a multi-touch capacitive touch screen,
   (iv) a self-capacitance detection threshold,
   (v) a self-capacitance peak strength, and
   (vi) a self-capacitance reference strength comprising one of an average touch strength or a median touch strength of a second selection of nodes of the multi-touch capacitive touch screen; and
   in response to the six input values, outputting a touch status selected from a touch status truth table representative of whether at least one of water or a wanted touch is present on the multi-touch capacitive touch screen.

2. The method of touch status determination according to claim 1, wherein the first selection of nodes comprises a randomized selection of mutual-capacitance nodes and wherein the second selection of nodes comprises a randomized selection of self-capacitance nodes.

3. The method of touch status determination according to claim 1, further comprising:
   performing a mutual flag setting step comprising evaluating a first truth statement based on the mutual capacitance detection threshold, the mutual capacitance peak strength, and the mutual capacitance reference strength; and
   performing a self-flag setting step comprising evaluating a second truth statement based on the self-capacitance detection threshold, the self-capacitance peak strength, and the self-capacitance reference strength.

4. The method of touch status determination according to claim 3, wherein the first truth statement comprises: Mutual Peak Touch Strength−Mutual Reference Strength>Mutual Detection Threshold.

5. The method of touch status determination according to claim 4, wherein the second truth statement comprises: Self-Peak Touch Strength–Self Reference Strength<Self-Detection Threshold.

6. The method of touch status determination according to claim 5,
wherein the touch status comprises an indication that the water is present on the multi-touch capacitive touch screen in response to a mutual flag indicating a TRUE status and a self-flag indicating a TRUE status.

7. A method, comprising:
performing a first touch detection comprising:
defining a peak node selection window comprising a fixed window and defining a reference node selection window comprising a randomized reference selection window comprising a random number of nodes arranged in a random pattern across a multi-touch capacitive touch screen; and
determining a capacitance detection threshold in response to a comparison of a touch strength associated with one or more node of the peak node selection window and the touch strength associated with one or more node of the reference node selection window.

8. The method according to claim 7, wherein the nodes comprise mutual capacitance nodes.

9. The method according to claim 8, further comprising performing a second touch detection comprising:
defining a self-capacitance peak node selection window comprising a fixed window and defining a self-capacitance reference node selection window comprising a randomized reference selection window comprising a random number of nodes arranged in a random pattern across the multi-touch capacitive touch screen; and
determining a self-capacitance detection threshold in response to a comparison of the touch strength associated with one or more node of the self-capacitance peak node selection window and the touch strength associated with one or more node of the self-capacitance reference node selection window.

10. The method according to claim 9, further comprising performing a touch status determination method configured to output a touch status selected from a touch status truth table representative of whether at least one of water or a wanted touch is present on the multi-touch capacitive touch screen.

11. A method of water detection, comprising:
performing a mutual capacitance touch detection;
performing a self-capacitance touch detection; and
performing a touch status determination method to determine a touch status in response to the mutual capacitance touch detection and the self-capacitance touch detection;
wherein the mutual capacitance touch detection comprises:
defining a mutual capacitance peak node selection window;
defining a mutual capacitance reference node selection window;
collecting a touch strength of each node in the mutual capacitance reference node selection window and collecting the touch strength of each node in the mutual capacitance peak node selection window;
determine at least one of (i) a mutual capacitance median touch strength comprising a median touch strength collected in the mutual capacitance reference node selection window and (ii) a mutual capacitance average touch strength comprising an average touch strength collected in the mutual capacitance reference node selection window;
setting a mutual capacitance reference strength equal to one of the mutual capacitance median touch strength and the mutual capacitance average touch strength;
determining a mutual capacitance peak strength comprising a highest magnitude of touch strength detected within the mutual capacitance peak node selection window; and
defining a mutual capacitance detection threshold in response to the mutual capacitance peak strength and the mutual capacitance reference strength.

12. The method of water detection according to claim 11, wherein the self-capacitance touch detection comprises:
defining a self-capacitance peak node selection window;
defining a self-capacitance reference node selection window;
collecting the touch strength of each node in the self-capacitance reference node selection window and collecting the touch strength of each node in the self-capacitance peak node selection window;
determine at least one of (i) a self-capacitance median touch strength comprising the median touch strength collected in the self-capacitance reference node selection window and (ii) a self-capacitance average touch strength comprising the average touch strength collected in the self-capacitance reference node selection window;
setting a self-capacitance reference strength equal to one of the self-capacitance median touch strength and the self-capacitance average touch strength;
determining a self-capacitance peak strength comprising a highest magnitude of touch strength detected within the self-capacitance peak node selection window; and
defining a self-capacitance detection threshold in response to the self-capacitance peak strength and the self-capacitance reference strength.

13. The method of water detection according to claim 12, wherein the self-capacitance reference node selection window comprises a randomized reference selection window comprising a random number of nodes arranged in a random pattern across the multi-touch capacitive touch screen.

14. The method of water detection according to claim 12, wherein the touch status determination method comprises to receive (i) the mutual capacitance detection threshold, (ii) the mutual capacitance peak strength, (iii) the mutual capacitance reference strength, (iv) the self-capacitance detection threshold, (v) the self-capacitance peak strength, (vi) the self-capacitance reference strength and to output a touch status selected from a touch status truth table representative of whether at least one of water or a wanted touch is present on the multi-touch capacitive touch screen.

15. The method of water detection according to claim 14, wherein the touch status determination method comprises:
a mutual flag setting step comprising evaluating a first truth statement based on the mutual capacitance detection threshold, the mutual capacitance peak strength, and the mutual capacitance reference strength; and
a self-flag setting step comprising evaluating a second truth statement based on the self-capacitance detection threshold, the self-capacitance peak strength, and the self-capacitance reference strength.

16. The method of water detection according to claim 15, wherein the first truth statement comprises Mutual Peak Touch Strength–Mutual Reference Strength>Mutual Detection Threshold; and wherein the second truth statement comprises Self-Peak Touch Strength−Self Reference Strength<Self-Detection Threshold.

17. The method of water detection according to claim 15, wherein the touch status comprises an indication that the water is present on the multi-touch capacitive touch screen in response to a mutual flag indicating a TRUE status and a self-flag indicating a TRUE status.

18. The method of water detection according to claim 15, wherein the touch status comprises an indication that no water is present on the multi-touch capacitive touch screen in response to at least one of the mutual flag and the self-flag indicating a FALSE status.

19. The method of water detection according to claim 11, wherein the mutual capacitance reference node selection window comprises a randomized reference selection window comprising a random number of nodes arranged in a random pattern across a multi-touch capacitive touch screen.

20. A method of water detection, comprising:
performing a mutual capacitance touch detection;
performing a self-capacitance touch detection; and
performing a touch status determination method to determine a touch status in response to the mutual capacitance touch detection and the self-capacitance touch detection;
wherein the self-capacitance touch detection comprises:
defining a self-capacitance peak node selection window;
defining a self-capacitance reference node selection window;
collecting the touch strength of each node in the self-capacitance reference node selection window and collecting the touch strength of each node in the self-capacitance peak node selection window;
determine at least one of (i) a self-capacitance median touch strength comprising the median touch strength collected in the self-capacitance reference node selection window and (ii) a self-capacitance average touch strength comprising the average touch strength collected in the self-capacitance reference node selection window;
setting a self-capacitance reference strength equal to one of the self-capacitance median touch strength and the self-capacitance average touch strength;
determining a self-capacitance peak strength comprising a highest magnitude of touch strength detected within the self-capacitance peak node selection window; and
defining a self-capacitance detection threshold in response to the self-capacitance peak strength and the self-capacitance reference strength.

21. The method of water detection according to claim 20, wherein the self-capacitance reference node selection window comprises a randomized reference selection window comprising a random number of nodes arranged in a random pattern across the multi-touch capacitive touch screen.

22. A method for performing a touch sensing, comprising:
defining a self-capacitance peak node selection window comprising a fixed window include plural fixed nodes within a multi-touch capacitive touch screen;
defining a self-capacitance reference node selection window comprising a randomized reference selection window comprising random nodes selected within the multi-touch capacitive touch screen;
determining a self-capacitance detection threshold in response to a comparison of the touch strength associated with one or more nodes of the self-capacitance peak node selection window and an average or median value of the touch strengths associated with the nodes of the self-capacitance reference node selection window; and
identifying a self-capacitance touch if a self-capacitance touch strength minus the average or median value is greater than the self-capacitance detection threshold.

23. A method for performing a touch sensing, comprising:
defining a mutual capacitance peak node selection window comprising a fixed window include plural fixed nodes within a multi-touch capacitive touch screen;
defining a mutual capacitance reference node selection window comprising a randomized reference selection window comprising random nodes selected within the multi-touch capacitive touch screen;
determining a mutual capacitance detection threshold in response to a comparison of the touch strength associated with one or more nodes of the mutual capacitance peak node selection window and an average or median value of the touch strengths associated with the nodes of the mutual capacitance reference node selection window; and
identifying a mutual capacitance touch if a mutual capacitance touch strength minus the average or median value is greater than the mutual capacitance detection threshold.

24. A method for performing a touch sensing, comprising:
defining a self-capacitance peak node selection window comprising a fixed window include plural fixed nodes within a multi-touch capacitive touch screen;
defining a self-capacitance reference node selection window comprising a reference selection window comprising a subset of nodes selected within the self-capacitance peak node selection window;
determining a self-capacitance detection threshold in response to a comparison of the touch strength associated with one or more nodes of the self-capacitance peak node selection window and an average or median value of the touch strengths associated with the nodes of the self-capacitance reference node selection window; and
identifying a self-capacitance touch if a self-capacitance touch strength minus the average or median value is greater than the self-capacitance detection threshold.

25. A method for performing a touch sensing, comprising:
defining a mutual capacitance peak node selection window comprising a fixed window include plural fixed nodes within a multi-touch capacitive touch screen;
defining a mutual capacitance reference node selection window comprising a reference selection window comprising a subset of nodes selected within the mutual capacitance peak node selection window;
determining a mutual capacitance detection threshold in response to a comparison of the touch strength associated with one or more nodes of the mutual capacitance peak node selection window and an average or median value of the touch strengths associated with the nodes of the mutual capacitance reference node selection window; and
identifying a mutual capacitance touch if a mutual capacitance touch strength minus the average or median value is greater than the mutual capacitance detection threshold.

* * * * *